United States Patent
Wallace et al.

(10) Patent No.: US 6,353,628 B1
(45) Date of Patent: Mar. 5, 2002

(54) APPARATUS, METHOD AND SYSTEM HAVING REDUCED POWER CONSUMPTION IN A MULTI-CARRIER WIRELINE ENVIRONMENT

(75) Inventors: Andrew David Wallace, Harlow; Christopher Neville Tate, Herts; Mike Francis Grant, Hertfordshire, all of (GB)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/211,881

(22) Filed: Dec. 15, 1998

(51) Int. Cl.[7] .................. H04B 1/38; G08C 17/00; H04M 11/00
(52) U.S. Cl. ................. 375/220; 370/311; 379/93.01
(58) Field of Search ................. 370/480, 482, 370/484, 485, 491, 503, 509, 510, 512, 450, 311; 375/260, 219–223; 713/323, 324, 320; 455/574; 379/93.01, 93.02

(56) References Cited

U.S. PATENT DOCUMENTS

| | | | | |
|---|---|---|---|---|
| 5,751,701 A | * | 5/1998 | Langberg et al. | 370/281 |
| 5,768,605 A | * | 6/1998 | Fuller et al. | 713/324 |
| 5,978,923 A | * | 11/1999 | Kou | 713/323 |
| 5,995,540 A | * | 11/1999 | Draganic | 375/222 |
| 6,052,411 A | * | 4/2000 | Mueller et al. | 375/222 |
| 6,075,814 A | * | 6/2000 | Yamano et al. | 375/222 |
| 6,148,006 A | * | 11/2000 | Dyke et al. | 370/480 |
| 6,167,078 A | * | 12/2000 | Russo | 375/222 |

* cited by examiner

*Primary Examiner*—Ajit Patel
*Assistant Examiner*—Hanh Nguyen
(74) *Attorney, Agent, or Firm*—Lee, Mann, Smith, McWilliams, Sweeney & Ohlson

(57) ABSTRACT

To reduce power consumption and associated heating in a line card of line termination equipment (LTE, 12) employing multiple cub-channel carriers to communicate broadband information to customer premise equipment (CPE, 30) down a wireline communication resource (26, sub-channel carrier transmissions are restricted (58) during periods of CPE inactivity. Power supplies to a power amplifier (30) associated with the line card and wireline resource (26) are reduced, with digital signal processing capabilities of the LTE (12) further restricted (64). When the CPE wishes to re-start communication, the CPE (30) locks (68) to a correct alignment in a transmission scheme using a pilot tone that is transmitted within a simple pattern sent during reduced sub-channel carrier transmissions. Alternatively, should all transmission from the LTE cease during CPE inactivity, then the CPE monitors (80) the transmission environment and sends (82) a wake-up call to the LTE between boundaries of an uplink slot. The LTE (12) re-establishes pilot tone transmissions (86), with synchronization and lock (88) subsequently achievable by the CPE (30): this is illustrated in FIG. 2.

40 Claims, 2 Drawing Sheets

APPARATUS, METHOD AND SYSTEM HAVING REDUCED POWER CONSUMPTION IN A MULTI-CARRIER WIRELINE ENVIRONMENT

BACKGROUND TO THE INVENTION

This invention relates, in general, to an apparatus, method and system arranged to minimise power consumption in a wireline environment, and is especially (but not exclusively) applicable to a wireline communication system that communicates relatively high frequency broadband signals over relatively low frequency voiceband signals, e.g. by using digital subscriber line (xDSL) communication protocols in bi-directional twisted-pair systems.

SUMMARY OF THE PRIOR ART

Telecommunication systems that interconnect wireline subscriber terminals are being developed to support broadband data communication More particularly, recent developments in broadband communication protocols allow broadband data to be overlaid on narrowband voice or integrated service digital network (ISDN) traffic. Specifically, the interconnection of broadband modems located at the subscriber terminal and at an exchange allow current broadband access systems to communicate on spare spectrum (i.e. spare frequency channels) of a twisted pair communication resource; the spare frequency channels being isolated from conventionally encoded voice signals by a suitable filter. In this respect, and depending upon the complexity of the xDSL coding scheme, overlaid broadband systems can support data rates in excess of two Megabits per second (Mbps), although this rate is dependent upon the physical parameters of the connection, e.g. the overall length of the twisted pair and its composition and configuration.

Asymmetric Digital Subscriber Line (ADSL) and High-speed Digital Subscriber Line (HDSL) protocols, for example, can support data rates of 2 Mbps over distances of approximately three kilometres, while more complex schemes (Such as VDSL) can support data rates of 8 Mbps and above over distances of typically, less than two kilometres. Protocols such as Very high-speed Digital Subscriber Line (VDSL) utilise multiple sub-channel carriers, e.g. in a discrete multi-tone (DMT) environment, to provide an adaptive system that mitigates the effects of cross-talk by selectively ignoring noise-effected sub-channel carriers or reducing the number of bits supported on each sub-channel. As will be appreciated, DMT provides a comb of frequency carriers that are each separated modulated and then combined to generate a composite signal envelope. As such, information (both control information and traffic) is distributed across a number of different frequency carriers.

DMT schemes for supporting, for example, VDSL are often realised in a time division duplex (TDD) transmission environment in which a single communication resource, i.e a frequency band, supports both up-link and down-link transmissions using the same frequencies. In other words, there is a sharing in time of the bandwidth provided by the extended spectrum. The use of guard periods between adjacent groups of time-slots within a TDD frame ensures that rogue overlapping transmissions within the up-link and down-link do not occur, and hence eliminates the likelihood of near-end cross talk (NEXT). In more detail, the guard periods provide a period in which a power amplilier can power-up and power-down, and also allow for some adjustment (i.e. alignment) of the frame with respect to a selected pilot tone on a designated sub-channel carrier of a DMT scheme.

In relation to bundles of wireline communication resources, it is also important to understand the potentially undesirable effects associated with cross-talk interference. Specifically, with bi-directional communication, the relative location of the lines, for example, between twisted copper-pair causes cross-talk interference to be induced into proximately located wireline communication resources (principally by the mechanisms of capacitive and inductive coupling and by radiation arising from the imperfect nature and performance of the cabling). Moreover, where symmetrical and asymmetrical service are simultaneously required on pairs in the same bundle, cross-talk becomes a significant problem, as will readily be appreciated.

For completeness, it will be understood that near-end cross-talk (NEXT) occurs when electromagnetic interference is induced into a wireline resource that is communicating information in an opposing direction, e.g. down-link (or downstream) information appears as noise in an up-link (or upstream) path. NEXT is undesirable because near-end generated interference is at a level that can potentially swamp data signals received from a remote terminal, which data signals have previously been subjected to attenuation through the transmission path. Furthermore, NEXT increases significantly at the higher frequency components and so is even more undesirable in high frequency data-over-voice wireline systems, such as VDSL. To avoid the harmful effects of Near-End Cross-Talk (NEXT) in a TDD system, an ensemble of collated communication resources must have synchronised and aligned transmissions However, in a mixed symmetrical/asymmetrical system. NEXT often occurs where the two opposing schemes have either different frequency allocations (in frequency division duplex, FDD) or different time slot allocations (in TDD).

With regard to Far End Cross-Talk (FEXT), this form of cross-talk affects non-addressed ports of a remote terminal. In other words, FEXT occurs when electromagnetic interference (i.e. noise) is induced into a wireline resource that is communicating information in a similar direction, e.g. upstream (or up-link) information appears as noise in another upstream wireline resource to an extent that performance on a given pair is limited. The effects of FEXT are correspondingly reduced by the attenuation path of the wireline resource. However, when multiple separate modem links exist (as supported by a multiplicity of different copper pairs proximally located towards the exchange LTE as a bundle of pairs in the access network and then fanned out to individual drops serving particular CPEs), crosstalk between the numerous signals at (or towards) the exchange presently generates noise that limits data-rate performance of both a given pair and the entire wireline system, in general. In synchronised systems, FEXT is inherent.

FEXT on adjacent pairs can be severely exacerbated from increased signal strengths at a receiver modem of the exchange LTE for the pair causing the FEXT. More especially, where these adjacent pairs have shorter reaches (i.e. shorter cable lengths), the attenuation of the signal in the wireline resource from such relatively closely located modems (as opposed to remotely located modems) is relatively little and, correspondingly. FEXT induced into adjacent wireline resources can be relatively large. In other words, in instances when FEXT from a relatively closely located modem is introduced into a wireline resource serving a distantly located modem, the FEXT interference effects can be catastrophic and corruption of the data from the distant modem absolute. For this reason, it is accepted that there is a need to "back-off" the power transmitted by the transmitting (CPE) modem in the upstream direction for all but the longest lines. Unfortunately, the necessity for back-off results in inefficient utilisation of the spectrum as a consequence of CPEs served by short loop distances having to forego the benefits of better signal to noise ratios (SNR) and therefore to restrict channel throughput by reducing power and lowering the bit transmission rate. In summary, FEXT is particularly problematic in the up-link at the LTE and limits spectral capacity generally.

The term "self-FEXT" will be understood to mean FEXT arising from use of the same time-slot and/or the same frequency for a common form of service (as opposed to differing services on a common wireline resource, such as a combination of ADSL and VDSL).

In order to establish effective end-to-end communication in a communication system, it is necessary for synchronisation between a transmitting unit and an interconnected receiving unit to occur, this is true for both a radio frequency environment and a wireline environment, such a VDSL system employed over a twisted pair. More specifically, synchronisation is required to demodulate encoded signals that are addressed to the receiver. In this respect and in relation to a DMT system (or the like, such as an orthogonal frequency division multiplexed OFDM scheme), a pilot carrier or tonal is used in a training sequence on a dedicated (pre-allocated) sub-channel. Initially, upon receipt of the pilot tone, the receiver acquires frequency lock and then establishes phase lock.

Another concern in relation to the implementation of wide bandwidth applications (required multi-carrier schemes) arises from the fact that the frequency spectrum seldom provides a homogeneous transmission environment and usually exhibits significant variations in its signal to noise (S:N) ratio across its bandwidth. In fact, portions of the spectrum are often unusable as a consequence of the presence of interference, such as noise and intermodulation products. To avoid these poor spectral regions, modems associated with the transmitter and receiver negotiate for the best sub-channel carriers during training and reject those sub-channel carriers that have a performance below a predetermined and acceptable threshold.

Another significant problem in a multi-carrier environment pertains to the peak power of the composite envelope formed by a summation of the individual sub-channel carriers. While techniques have been developed to restrict these peaks, there is still a general requirement for DMT equipment to support a wide (large) dynamic range.

In relation to a typical (although simplified) model of a wireline transmission path, line termination equipment (LTE) typically has an interface for receiving user data, which user data is subsequently applied to a digital signal processor (DSP). As will readily be appreciated, the DSP is configured to perform many signal processing tasks, including DMT encoding.

Following DMT encoding of the data, resultant signals are converted into the analog domain (in a digital-to-analog converter, DAC) before being applied to a power amplifier that is required to ensure that there is sufficient power to drive the wireline communication resource and therefore to ensure reception of the signals at the addressed customer premise equipment (CPE). As will be understood, a passive filter is generally included in the path between the power amplifier and the wireline, with a line impedance of the wireline having a nominal impedance value of approximately 100Ω (with the actual value being country specific). In other words, the power amplifier is required by virtue of the fact that copper pairs have low impedance and DAC operation is subject to restricted operational parameters.

In relation to the aforementioned transmission path, it will be appreciated that the functional elements are attributable to individual line cards of telecommunication exchanges, such as private branch exchanges (PBXs) and infrastructure nodes that integrate with ancillary services, e.g. Internet server.

Unfortunately, the power amplifier is responsible for dissipating approximately half of the total power of the line card and so its inclusion and operation generates significant heat (that must effectively be, channelled away from temperature sensitive integrated circuits) whilst also placing significant demands on power supplies within the exchange. Consequently, systems and schemes that reduce total power consumption in line cards are very desirable.

SUMMARY OF THE INVENTION

According to a first aspect of the present invention there is provided a wireline communication system comprising line termination equipment coupled to customer premise equipment through a wireline communication resource supporting a multi-carrier transmission scheme between the LTE and the CPE, the wireline communication system comprising means for indicating activity of the CPE; and a controller, responsive to the means for indicating activity, for selecting sub-channel carriers of the multi-carrier transmission scheme on which information is modulated for transmission to the CPE over the wireline resource, wherein the controller is arranged to limit a number of sub-channel carriers utilised by the LTE in response to the means for indicating activity identifying that the CPE is inactive.

The LTE typically comprises a line driver coupled to a voltage supply and arranged to amplify signals to be applied to the wireline communication resource, the voltage supply being operationally responsive to the controller and wherein the controller is arranged to reduce a voltage applied to power the line driver in response to the means for indicating activity identifying that the CPE is inactive.

In a preferred embodiment, the LTE comprises a signal processor operationally responsive to the controller, the controller arranged to at least partially disable operationally functionality of the signal processor in response to the means for indicating activity identifying that the CPE is inactive.

In another embodiment, the wireline communication system comprises a memory containing at least one pattern having relatively few sub-channel carriers in relation to a number of sub-channel carriers utilised during information transfer in a data path between the LTE and CPE, the LTE further comprising a switch operationally responsive to the controller and configured to couple one of the date path and the memory to the wireline communication resource, the controller further arranged to cause the at least one pattern to be applied to the wireline communication resource in response to the means for indicating activity identifying that the CPE is inactive.

The controller (28) maintains at least one sub-channel carrier in response to the means for indicating activity identifying that the CPE is inactive, this ensures that the CPE maintains synchronisation and reasonable lock.

In another aspect of the present invention there is provided a line card for coupling to customer premises equipment through a wireline communication resource supporting a multi-carrier transmission scheme, the line card comprising: means of establishing a presence of CPE activity; and a controller, responsive to the means of establishing a presence of CPE activity, for selecting sub-channel carriers of the multi-carrier transmission scheme on which information is modulated for transmission to the CPE over the wireline resource, wherein the controller is arranged to limit a number of sub-channel carriers utilised by the LTE in response to the means for indicating activity identifying that the CPE is inactive.

In yet another aspect of the present invention there is provided a method of reducing power consumption in line termination equipment coupled to customer premise equipment through a wireline communication resource supporting a multi-carrier transmission between the LTE and the CPE, the method comprising the steps of: determining activity of the CPE; and assigning a relatively large number of sub-channel carriers to support information modulation onto the wireline communication rescurce in a multi-carrier transmission; and utilising a reduced number of sub-channel carriers for transmissions from the LTE in response to the step of determining activity of the CPE identifying that the CPE is inactive.

In still yet another aspect of the present invention there is provided a method of establishing a multi-carrier transmission between a line card of an exchange and customer premise equipment through a dedicated wireline communication resource, the exchange coupled to a plurality of CPEs through a plurality of wireline resources in which cross-talk is experienced, the method comprising the steps of: at the CPE, monitoring a cross-talk environment to identify an uplink transmission slot to the LTE, transmitting a wake-up message to the CPE within the uplink transmission slot, at the LTE, receiving the wake-up message and sending to the CPE at least one pilot tone, and at the CPE, receiving the at least one pilot tone and acquiring synchronisation and lock therefrom.

Advantageously, therefore, the present invention reduces power consumption within a line card and line termination equipment (at an exchange, for example). Moreover, by virtue of the fact that the line driver or power amplifier can be backed-off, heat generation within the line card is reduced. Beneficially, with reduced power consumption and reduced heat generation, temperature regulation devices (such as heat sinks and fans) can be scaled down within exchanges which simplifies exchange construction and reduces manufacturing costs. Furthermore, with battery powered equipment (e.g. required when the mains supply is interrupted), prolonged operational life is obtained through lower power consumption.

BRIEF DESCRIPTION OF THE DRAWINGS

Exemplary embodiments of the present invention will now be described with reference to the accompanying drawings, in which.

DETAILED DESCRIPTION OF A PREFERRED EMBODIMENT

Figure 1:
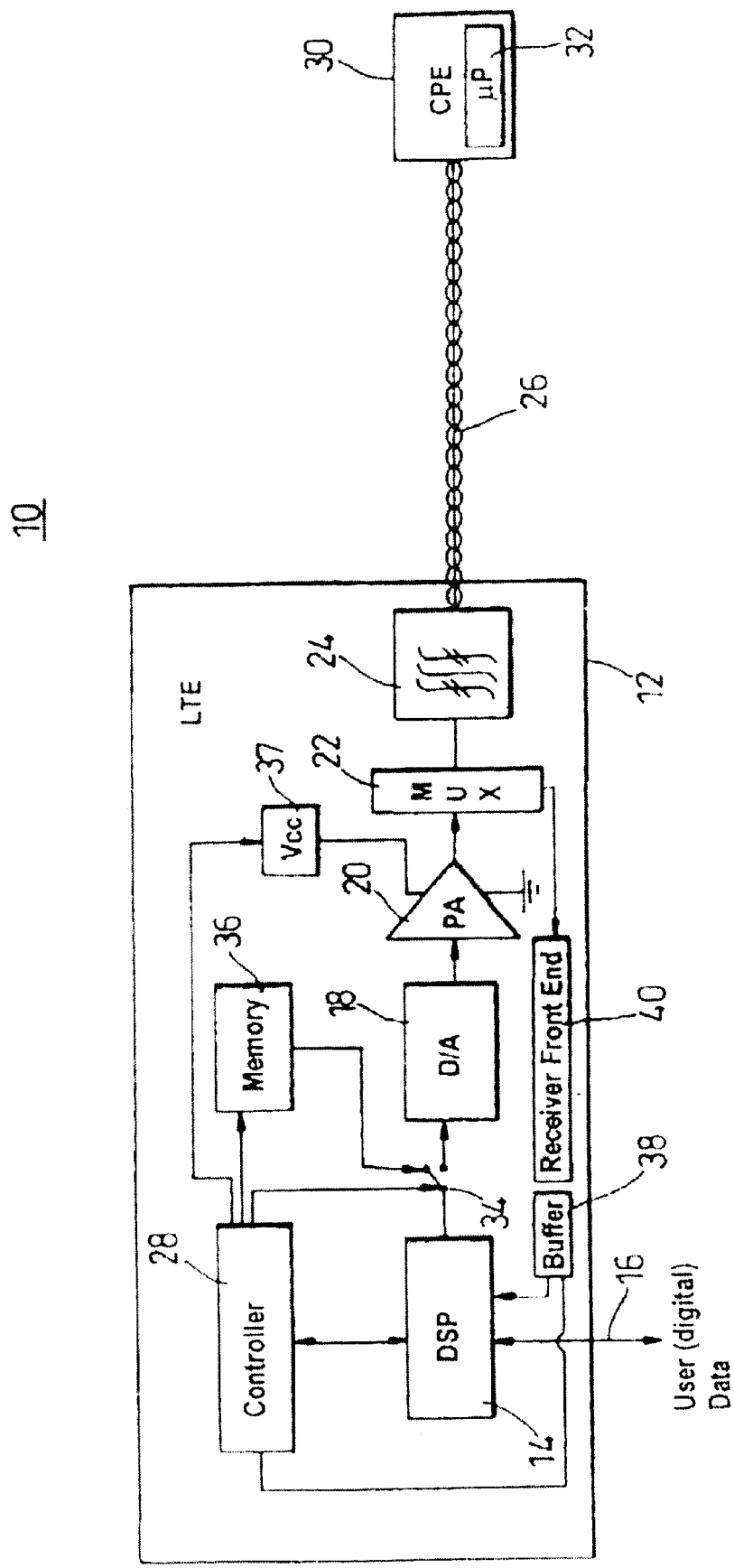
FIG. 1 is a block diagram of a wireline system employing various preferred embodiments of the present invention.

FIG. 1 shows an enhanced wireline system 10 employing various preferred embodiments of the present invention. A transmission path of LTE 12 contains a DSP 14 responsive to user data 16. The DSP 14 is coupled through a D/A converter 18 to a power amplifier or line driver (PA) 20 which is, in turn, coupled to a multiplexer/demultiplexer (MUX) 22 that therefore supports bi-directional communication within the LTE 12. A filter 24 is disposed intermediate between the MUX 22 and a wireline resource 26, such as a twisted copper pair. Operation of the LTE is controlled by a controller 28, although this function could be integrated into the DSP 14.

It will be appreciated that, generically, an exchange will contain a plurality of line cards and hence serve a plurality of CPEs through individual wireline resources, such as twisted copper pair. Moreover, the multiplicity of wireline resources will, to some extent, generally be bundled together before branching to a specific CPE. The exchange per se and the numerous CPEs have been omitted from FIG. 1 for the sake of clarity.

In an uplink direction to the LTE, the MUX 22 functions to route encoded (and modulated) signals to a receiver front end and then to the DSP 14 for signal processing.

The wireline resource 26 is connected to customer premise equipment (CPE) 30 that contains transmission and/or reception circuitry (as will readily be appreciate). Operational control of the CPE 30 is typically overseen by a microprocessor 32 or the like, with the functionality in the CPE 30 complementary to that provided in the LTE 12.

The structure of the LTE 12 (and for that matter the system as a whole) to this point corresponds to that in existing LTEs (systems).

Intermediate between the DSP 14 and the D/A 18 is a switch 34 that is operationally responsive to the controller 28. The switch 34 selectively isolates the DSP 14 from a transmit path in the LTE 12 and, in this position, couples a memory 36 to the transmit path. The content of the memory 36 will be described subsequently, with it presently suffice to say that the memory 36 can be accessed and controlled by the controller 28.

In order to appreciate fully the present invention, it is necessary to realise that the LTE 12 can deduce (or can be informed about) the absence of CPE activity, e.g. the CPE is either switched-off or has otherwise ceased to function. The CPE 30 can notify the LTE 12 of its intention to go off-line by sending an appropriate control message to the LTE on a dedicated control channel. Alternatively, the LTE 12 can deduce that the CPE is off-line through an increased bit error rate (BER) in the decoded data, i.e. random noise is decoded by the LTE with output values therefore containing invalid codewords. The LTE 12 can also determine CPE inactivity by virtue of the relatively low level of received power at the LTE, with the power being attributable merely to the energy of noise rather than in relation to transmitted symbols.

Irrespective of the reason for CPE inactivity, it is still essential that the LTE 12 regularly transmits synchronisation and timing information to the CPE 30: this ensures that the CPE 30 can come back on-line and acquire lock/synchronisation and correct alignment with respect to a transmission scheme adopted for a bundle of wireline resources. As previously indicated, it is beneficial to have synchronised transmissions from the LTEs and CPEs to avoid cross-talk. Ideally, re-establishment of the CPE into the system should be immediate.

The preferred embodiments of the present invention all operate to reduce power consumption and hence reduce heat generation during idle periods of CPE inactivity. There are several mechanisms that are employed that can be used independently or in combination to provide enhanced effects and improved reliability/performance.

Usually, when the wireline system is active, i.e. transmissions are occurring between a dedicated line card and its associated CPE, many hundreds of sub-channel carriers are used to relay information symbols. All these sub-channel carriers contribute to form a composite signal envelope in which there are significant power excursions from a nominal mean or root-mean-square (mis) level. It has been identified that, during idle periods, many of these sub-channel carriers become overhead, i.e they are redundant since they do not communicate meaningful information in the form of encoded symbols. Consequently, the controller 28 of the LTE 12 can effectively reduce the number of sub-channel carriers used to form the composite signal envelope when the CPE is off-line. In fact, it is possible to reduce the number of sub-channel carriers to only that number required to ensure/allow the CPE to detect the presence of the LTE and then to respond to register its own existence. For example, an on-going call could require four hundred sub-channel carriers, whereas a CPE idle condition may reduce this number to, perhaps, four or so. As will be appreciated, the reduction in the number of sub-channel carriers reduces the amplitude excursions in the composite signal envelope, i.e. the peak-to-peak level (as presented to the PA 20) is reduced significanly. Consequently, it is possible for the controller 28 to reduce a voltage supply $V_{ee}$ 37 (or its functional equivalent) applied to the line amplifier (i.e. the PA 20) in the transmit path and hence to cut both the power consumed and the heat generated by the PA 20. In other words, class A power dissipation in the PA 20 is reduced.

In relation to those sub-channel carriers that are kept live during periods of CPE inactivity, it is preferably that these be associated with pilot tones used by the multi-carrier transmission scheme. Moreover, it is preferable that the reduced number of sub-channel carriers form a fixed pattern, which pattern may be unique to a particular line card-CPE association. The number of sub-channel carriers selected may also be subject to quality of the link to the CPE, while it is also envisaged that the pattern could, if desired, be randomly or sequentially rotated to mitigate interference problems, although at least one sub-channel carrier associated with a pilot tone must be maintained in the pattern.

In relation to FIG. 1, once the controller 28 has identified an idle CPE, the controller isolates the DSP 14 by re-routing the transmission path from the memory 36. The memory 36 therefore contains the fixed pattern, whilst the controller 28 causes the fixed pattern to be sent for modulation, amplification and eventual transmission from the LTE 12 to the addressed (but idle) CPE 30. In relation to a rotating pattern, the controller 28 may generate a pseudo-random sequence to effect rotation or may rely upon a pre-stored sequence in memory 36.

In a preferred embodiment of this first aspect of the present invention, use of the simple pattern of fewer sub-channel carriers allows DSP functionality to be temporarily reduced. Therefore, current drawn (and hence powered consumed) by the DSP 14 can be scaled down to reflect the lower number of operational sub-channel carriers.

If all processing capabilities of the DSP 14 are disabled, e.g. the DSP is turned-off entirely, then this potentially presents a problem when the CPE 30 comes back on-line and attempts to re-establish effective communication. In other words, the DSP cannot initially process information, and it is unaware when meaningful information in once again being transmitted from the CPE 30. This can be overcome by providing at least one of two mechanisms. First, to allow information received from the CPE to be subsequently processed, the system 10 of FIG. 1 can be adapted to include a buffer 38 (such as a random access memory, RAM) in-line with receiver front end equipment 40 that is fed from the MUX 22. The buffer 38 need only store a few symbols of analog samples, with DSP functionality re-stored by virtue of the controller 28 analysing the status of the buffer 38. In relation to the buffering of data, it will be appreciated that the DSP processing in the LTE does take some time to establish and that, as such, there may be a necessity to continue buffering until a natural break in transmission from the CPE occurs, the buffer therefore acts in a "first in first out" (FIFO) capacity and so data is sequenced through the buffer during processing. Alternatively or additionally, DSP functionality and power can be re-stored by the controller 28 in response to the detection of an increased level of received signal strength. In this latter respect, receiver front end equipment 40 may contain a suitable received signal strength indicator (RSSI) circuit or a software algorithm can be stored in memory 36 and accessed by the controller 28 in relation to all incoming data (whether spurious noise-related or legitimate information).

In order to further reduce transmissions from the LTE during CPE inactivity and therefore to further reduce power dissipation and heat generation associated with the PA 20, a further embodiment contemplates restricting dowrlink transmissions; this can be implemented in association with the simple pattern of fewer sub-channel carriers, or may be independently actioned with all sub-channel carriers. Specifically, once the LTE 12 has identified a CPE as being in an idle mode, the periodicity of downlink transmission from the LTE is decreased. In other words, a superframe structure is established with only one frame in N containing any form of donwlink transmissions from the LTE to a specifically addressed but idle CPE 30. This system, whilst still further reducing power consumption in the line card, is a compromise inasmuch a CPE going back on-line is denied uplink communication capacity until such time as it receives the pilot tones and it also achieves lock acquisition.

Yet another embodiment of the present invention proposes that downlink transmission in a superframe environment be offset between the various wireline resources within a bundle of twisted pairs, for example. By moving to a burst transmission environment with respect to idle CPEs, cross-talk between collocated wireline resources is reduced since there is no simultaneous transmission.

In another embodiment, the LTE 12 firstly determines inactivity at the CPE 30 and then enters a dormant transmission mode to the CPE by disabling its DSP 14 and suspending sub-channel carrier transmission to the CPE 30. In this instance, both the CPE and LTE are unaware of each other's mutual existence. Once the CPE requires service, the CPE powers-up and has its microprocessor 32 monitor the cross-talk environment to identify a nominal uplink slot e.g. a TDD slot. This system is immediately effective in relation to an asymmetric transmission scheme in which uplink and downlink transmission having different durations. However, in an equally split duty cycle environment, it is necessary for the microprocessor 32 of the CPE 30 to analyse the frequency characteristics of the cross-talk to differentiate FEXT-related and NEXT-related transmission. For example, the CPE 30 may seek to identify coherent pilot tones that are entirely indicative of downlink transmissions. In other multi-carrier environments, different line codes are used for each or the uplink and downlink paths and so the CPE 30 is able to identify the uplink from the downlink by virtue of the fact that each line code has a distinct frequency characteristic. As will be appreciated, the microprocessor (or its equivalent) includes suitable control algorithms that can assess spectral characteristics and regulate transmission from the CPE.

The CPE 30, once armed with approximate timing information concerning transmission direction boundaries, sends a wake-up transmission to the LTE 12 in about the centre of the uplink slot (but certainly within the guard bands associated with the uplink slot). More specifically, the CPE 30 sends a wake-up message on a small number of sub-channel carriers to limit interference on adjacent lines. The LTE 12, using the RSSI or buffering techniques mentioned above, re-enables its dormant DSP 14 and line driver (i.e. PA 20) and then transmits its normal training sequence back to the CPE 30 to effect accurate synchronisation and lock. Full-blown communication can then commence, although it will be appreciated that there is a finite delay before the CPE is serviceable.

Figure 2:
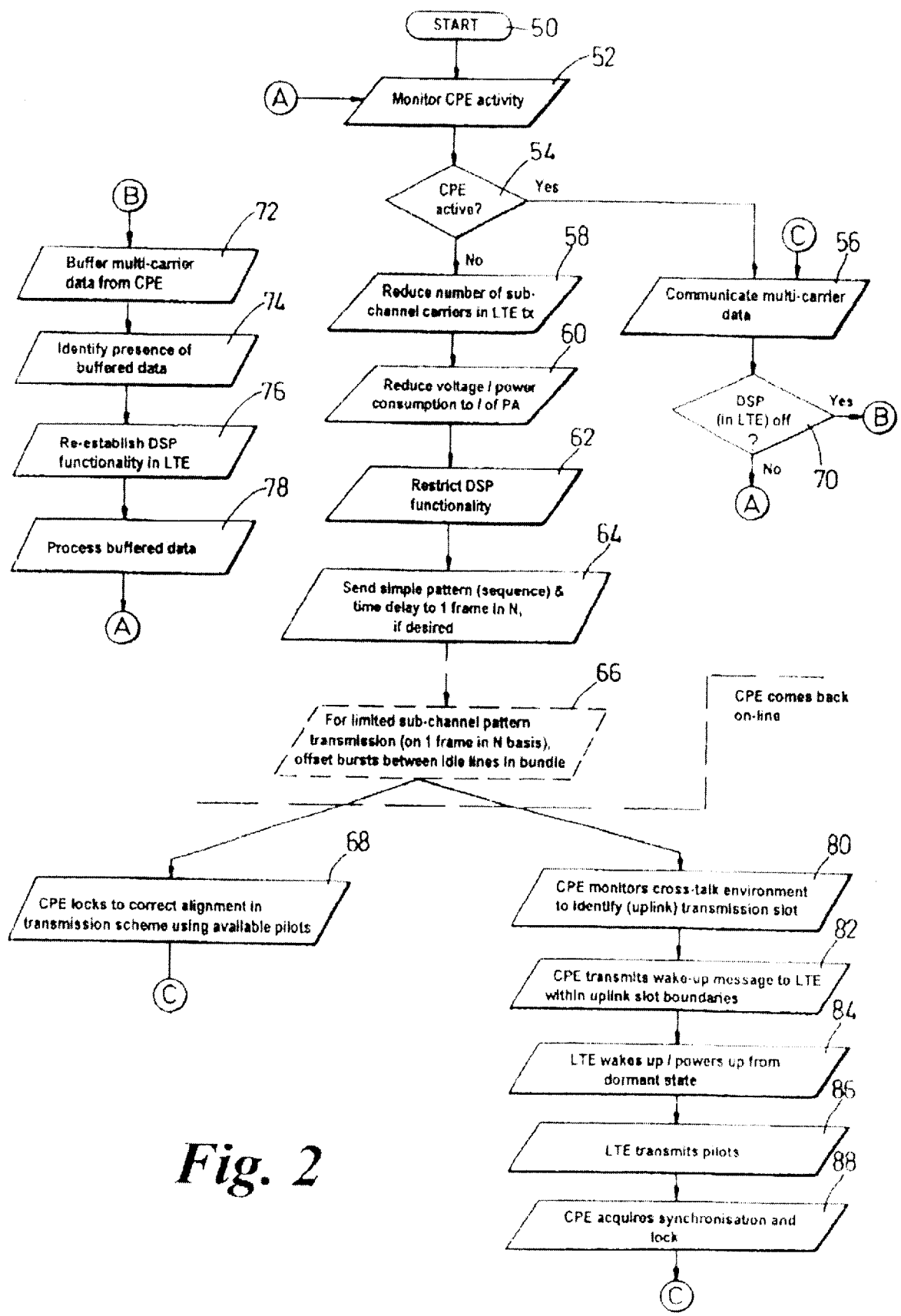
FIG. 2 is a flow diagram illustrating the steps employed in the wireline system of FIG. 1 to reduce power consumption (principally) in line termination equipment (LTE).

The mechanism by which power consumption in the LTE 12 is reduced is summarised in FIG. 2. Assuming that the default (start) position 50 is that the LTE 12 is fully operational and configured to transmit a multi-carrier signal, monitoring 52 of CPE activity precedes a determination 54 of CPE activity. Should the CPE be active, then there is conventional communication 56 of multi-carrier data, and the process basically loops back to the monitoring and subsequent determination of CPE activity. In the negative, i.e. the CPE is determined to be idle, then flow proceeds to step 58 where the LTE (or line card) reduces the number of sub-channel carriers used in transmission: this could be to zero or to the simple pattern that preferably includes at least one pilot tone.

Contemporaneously with the reduction in the number of sub-channel carriers, the controller 28 of the LTE can reduce 60 the voltage/power consumption to/of the PA 30. If desired, the functionality of the DSP call be restricted 62 by the controller 28. The LTE is then arranged to send 64 a simple pattern (which can be sequenced or time delayed to 1 frame in N). Of course, in the limit, all transmission to a dormant CPE could cease. In the case of a limited sub-channel pattern, the LTE may co-ordinate its 1 in N frame transmission such as to offset 66 bursts between idle lines in a bundle.

Depending on whether or not the LTE 12 maintains some form of limited transmission to the CPE during CPE idling determines the route taken when the CPE comes back on-line. If the LTE transmits the simple pattern, flow proceeds to step 68 in which the CPE locks to correct alignment in transmission scheme, whereafter multi-carrier communication can re-commence from the CPE, flow returns to step 56. However, the LTE may have to have its DSP functionality restored and so a test is made to this extent at step 70 If LTE DSP functionality is fully enabled then effective decoding can take place immediately. However, if the operational capacity of the LTE DSP 14 has been scaled down or disabled in its entirety then incident multi-carrier data transmitted by the CPE must be buffered 72. The controller 28 of the LTE, using either an RSSI circuit of a buffer flag associated with data in the buffer 38, identifies 74 the presence of the buffered data and then reestablishes 76 necessary DSP functionality. The LTE (and particularly the DSP 14) is then able to process 78 the buffered data to recover user data.

If the LTE 12 has ceased transmission and the CPE wishes to come back on-line, the CPE monitors 80 the cross-talk environment to identify an uplink transmission slot. The CPE 30 then transmits 82 a wake-up message to the LTE 12, but ensures that this wake-up message is confinec within the boundaries of the uplink slot. The controller 28, in response to the wake-up message from the CPE (typically transmitted on a selected and limited number of sub-channel carriers assigned as control channels) wakes-up/powers-up 84 from its dormant transmission state. The LTE 12 then transmits 86 pilots downlink to the CPE, which pilot are used by the CPE 30 to acquire 88 synchronisation and lock before multi-carrier communication is established 56.

Of course, whenever the CPE goes off-line, power consumption (and associated heating) in the CPE is also reduced. Clearly, in a battery-driven environment, CPE inactivity can enhance battery life.

It will, of course, be appreciated that the above description has been given by way of example only and that modification in detail may be made within the scope of the present invention. The preferred embodiments of the present invention are applicable to frequency division multiplexing (FDM) techniques and time division multiplexing (TDM) techniques such as (particularly) TDD. For example, the preferred embodiment of the present invention is generally concerned with re-establishment of a multi-carrier communication, although the principle of having the CPE monitor the cross-talk environment (steps 80 to 88 of FIG. 2) can be independently employed with respect to a CPE wanting to establish a communication connection with the LTE.

The system of FIG. 1 shares many common features with prior art configurations. Consequently, prior art systems may be easily up-graded to accommodate the inventive concepts of the present invention, with such easy migration therefore encouraging deployment of the preferred embodiments to achieve improved operational performance at relatively little expense.

The term "line termination equipment (LTE)" generally suggest a high level entity, although in the context of the present invention this term should not be considered to be restrictive and should be considered to include a solitary line card that is uniquely assigned to serve associated customer premise equipment (such as a modem or a computer) through a dedicate wireline communication resource. Indeed, it will be appreciated that a line card will generally include some signal processing capability (which could be pooled, although it is usually a dedicated DSP), a line driver, a D/A converter and some form of modulator. Of course, the line card typically further includes an analog-to-digital (A/D) converter and a demodulator in a receive path thereof to enable bi-directional communication.

We claim:

1. A wireline communication system comprising line termination equipment (LTE) coupled to customer premise equipment (CPE) through a wireline communication resource supporting a multi-carrier transmission scheme between the LTE and the CPE in which a plurality of sub-channel carriers convey information symbols from the LTE to the CPE, the wireline communication system comprising:

means for indicating activity and inactivity of the CPE; and
a controller responsive to the means for indicating activity and inactivity for selecting sub-channel carriers of the multi-carrier transmission scheme on which information is modulated for transmission to the CPE over the wireline resource wherein the controller is arranged, in response to the means for indicating activity identifying that the CPE is inactive, to limit the number of sub-channel carriers utilised by the LTE only to those required to allow the CPE to detect the presence of the LTE and to respond and register with the LTE.

2. The wireline communication system of claim 1, wherein the LTE comprises a line driver coupled to a voltage supply and arranged to amplify signals to be applied to the wireline communication resource, the voltage supply being operationally responsive to the controller and wherein the controller is arranged to reduce a voltage applied to power the line driver in response to the means for indicating activity identifying that the CPE is inactive.

3. The wireline communication system of claim 1, wherein the LTE comprises a signal processor operationally responsive to the controller, the controller arranged to at least partially disable operational functionality of the signal processor in response to the means for indicating activity identifying that the CPE is inactive.

4. The wireline communication system of claim 1, further comprising a memory containing at least one pattern having relatively few sub-channel carriers in relation to a number of sub-channel carriers utilised during information transfer in a data path between the LTE and CPE, the LTE further comprising a switch operationally responsive to the controller and configured to couple one of the data path and the memory to the wireline communication resource, the controller further arranged to cause the at least one pattern to be applied to the wireline communication resource in response to the means for indicating activity identifying that the CPE is inactive.

5. The wireline communication system of claim 1, wherein the controller maintains at least one sub-channel carrier in response to the means for indicating activity identifying that the CPE is inactive.

6. The wireline communication system of claim 1, wherein the at least one sub-channel carrier includes a pilot tone.

7. The wireline communication system of claim 4, wherein the at least one pattern is associated with a plurality of sub-channel carriers.

8. The wireline communication system of claim 4, wherein the controller is arranged to sequence an application of a plurality of patterns stored in the memory onto the wireline communication resource.

9. The wireline communication system of claim 8, wherein each of the plurality of patterns contains at least one pilot tone.

10. The wireline communication system of claim 9, wherein sequencing by the controller is random.

11. The wireline communication system of claim 9, wherein sequencing by the controller is delayed to produce a multi-carrier transmission on a limited number of sub-channel carriers on a one-in-N frame basis.

12. The wireline communication system of claim 1, wherein the controller disables the transmission of the multi-carrier transmission scheme in response to the means for indicating activity identifying that the CPE is inactive.

13. The wireline communication system of claim 2, wherein the voltage applied to power the line driver is reduced to substantially zero.

14. The wireline communication system of claim 1, wherein the multi-carrier transmission scheme supports a digital subscriber line (xDSL) communication protocol.

15. The wireline communication system of claim 14, wherein the multi-carrier transmission scheme overlays relatively low frequency voiceband transmissions.

16. The wireline communication system of claim 1, wherein the line termination equipment is a line card.

17. A line card for coupling to customer premise equipment (CPE) through a wireline communication resource supporting a multi-carrier transmission scheme in which a plurality of sub-channel carriers convey information symbols from the line card to the CPE, the line card comprising:

means of establishing a presence of CPE activity and inactivity; and a controller responsive to the means of establishing a presence of CPE activity for selecting a sub-channel carriers of the multi-carrier transmission scheme on which information is modulated for transmission to the CPE over the wireline resource wherein the controller is arranged to limit a number of sub-channel carriers utilised by the line card in response to the means for indicating activity identifying that the CPE is inactive, so as to limit the number of sub-channel carriers utilised by the line card only to those required to allow the CPE to detect the presence of the line card and to respond and register with the line card.

18. The line card of claim 17, further comprising a line driver coupled to a voltage supply and arranged to amplifier signals to be applied to the wireline communication resource, the voltage supply operationally responsive to the controller and wherein the controller is arranged to reduce a voltage applied to power the line driver in response to the means for indicating activity identifying that the CPE is inactive.

19. The line card of claim 17, further comprising a signal processor operationally responsive to the controller, the controller arranged to at least partially disable operational functionality of the signal processor in response to the means for indicating activity identifying that the CPE is inactive.

20. The line card of claim 17, further comprising a memory containing at least one pattern having relatively few sub-channel carriers in relation to a number of sub-channel carriers utilised during information transfer in a data path between the line card and CPE, the line card further comprising a switch operationally responsive to the controller and configured to couple one of the data path and the memory to the wireline communication resource, the controller further arranged to cause the at least one pattern to be applied to the wireline communication resource in response to the means for indicating activity identifying that the CPE is inactive.

21. The line card of claim 17, wherein the controller maintains at least one sub-channel carrier in response to the means for indicating activity identifying that the CPE is inactive.

22. The line card of claim 21, wherein the at least one sub-channel carrier includes a pilot tone.

23. The line card of claim 21, wherein the at least one pattern is associated with a plurality of sub-channel carriers.

24. The line card of claim 20, wherein the controller is arranged to sequence an application of a plurality of patterns stored in the memory onto the wireline communication resource.

25. A method of reducing power consumption in line termination equipment (LTE) coupled to customer premise equipment (CPE) through a wireline communication resource supporting a multi-carrier transmission between the LTE and the CPE in which a plurality of sub-carriers convey information symbols from the LTE to the CPE, the method comprising the steps of:

determining activity and inactivity of the CPE;

assigning a relatively large number of sub-channel carriers to support information modulation onto the wireline communication resource in a multi-carrier transmission when the CPE is determined to be in a active condition; and utilising a reduced number of sub-channel carriers for transmissions from the LTE in response to the step of determining activity of the CPE identifying that the CPE is inactive so as to limit the number of sub-channel carriers utilised by the LTE only to those required to allow the CPE to detect the presence of the LTE and to respond and register with the LTE.

26. The method of reducing power consumption according to claim 25, wherein the LTE comprises a line driver coupled to a voltage supply, arranged to amplifier signals to be applied to the wireline communication resource, the method further comprising the steps of:

reducing a voltage applied to power the line driver in response to the step of determining activity of the CPE identifying that the CPE is inactive.

27. The method of reducing power consumption according to claim 25, wherein the LTE comprises a signal processor and the method comprises the step of at least partially disabling operational functionality of the signal processor in response to the step of determining activity of the CPE identifying that the CPE is inactive.

28. The method of reducing power consumption according to claim 25, the LTE further comprising a memory and a switch, the method further comprising the steps of:

storing in the memory at least one pattern identifying relatively few sub-channel carriers with respect to a number of sub-channel carriers used during information transfer in a data path between the LTE and CPE;

in response to the step of determining activity of the CPE, using the switch selectively to isolate one of the data path and the memory with respect to the wireline communication resource; and in response to the step of determining activity identifying that the CPE is inactive, isolating the data path and causing the at least one pattern to be applied to the wireline communication resource.

29. The method of reducing power consumption according to claim 25, further comprising the step of maintaining transmission of at least one sub-channel carrier in response to the step of determining activity identifying that the CPE is inactive.

30. The method of reducing power consumption according to claim 29, wherein the at least one sub-channel carrier includes a pilot tone.

31. The method of reducing power consumption according to claim 28, wherein the at least one pattern is associated with a plurality of sub-channel carriers.

32. The method of reducing power consumption according to claim 28, further comprising the steps of:

storing a plurality of patterns in the memory (36); and sequentially applying the plurality of patterns onto the wireline communication resource.

33. The method of reducing power consumption according to claim 32, wherein each of the plurality of patterns contains at least one pilot tone.

34. The method of reducing power consumption according to claim 32, wherein sequencing is random.

35. The method of reducing power consumption according to claim 32, wherein sequencing is delayed to produce a multi-carrier transmission on a limited number of sub-channel carriers on a one-in-N frame basis.

36. The method of reducing power consumption according to claim 25, further comprising the step of disabling transmissions by the LTE to the CPE in response to the step of determining activity of the CPE identifying that the CPE is inactive.

37. The method of reducing power consumption according to claim 26, further comprising the step of reducing to substantially zero a voltage applied to power the line driver.

38. The method of reducing power consumption according to claim 25, wherein the multi-carrier transmission scheme supports a digital subscriber line (xDSL) communication protocol.

39. The method of reducing power consumption according to claim 38, wherein the multi-carrier transmission scheme overlays relatively low frequency voiceband transmissions.

40. The method of reducing power consumption according to claim 29, further comprising the step of re-establishing multi-carrier transmission between the LTE and the CPE, the step of re-establishing further comprising the steps of:

at the CPE, locking to correct alignment in the transmission scheme using the at least one sub-channel carrier.

* * * * *